UNITED STATES PATENT OFFICE.

DAVID WHYTE, OF GISBORNE, NEW ZEALAND.

PROCESS FOR THE CONVERSION OF SULPHATE OF LEAD WATER PASTE INTO OIL PASTE.

1,419,655.     Specification of Letters Patent.     Patented June 13, 1922.

No Drawing.     Application filed June 27, 1921. Serial No. 480,880.

*To all whom it may concern:*

Be it known that I, DAVID WHYTE, subject of the King of Great Britain, residing at 214 Whitaker Street, Gisborne, in the Dominion of New Zealand, have invented a new and useful Process for the Conversion of Sulphate of Lead Water Paste into Oil Paste, of which the following is a specification.

This invention has reference to the manufacture of white lead pigment for use in the formation of paints and particularly to the manufacture of such material from sulphate of lead.

In the preparation of this material, the sulphate of lead in the form of a wet precipitate is produced by the well known process in which acetate of lead is precipitated by sulphuric acid and this wet precipitate contains an amount of water, both in a free state, and in a state of crystalline admixture with the lead particles. These free waters and also the waters of crystallization require to be entirely removed from the lead in order that the lead particles may take up oil for the conversion of the water paste into the ordinary oil paste of commerce.

It has hitherto been proposed to remove such waters by the submission of the wet paste to pressure to extract the main quantity of the water, and then by subjection of the paste to admixture with an excess quantity of oil by which, in effect, a paint is formed, the water separated in a free state and mechanically removed, and then the excess of oil extracted to reduce the fluidity of the mixture and form it into a paste. This method, is, however, costly owing to the waste of oil resulting from its employment.

It has also been proposed to treat the paste after treatment in presses, to a pugging action with oil under which the paste and the oil are worked together first by admixture of a small proportion of the paste with a large proportion of the oil and then adding the remainder of the paste and of the oil. This process is unsatisfactory in that an intimate contact of the whole of the lead paste particles with the oil during the latter portion of the treatment is rendered difficult, with the result that the oil paste produced is uneven in character.

I have found that if, after an initial drying of the water paste to produce a powder of the precipitate, the said powder is mechanically agitated, as by churning, with the full quantity of oil just sufficient to provide for the intimate association of every particle thereof with the oil, the whole of the waters of crystallization are broken out and freed and the said particles are caused to combine with the oil to produce an oil paste that, when made up into paint, will be free from grit and will form a fine even constituency.

The invention therefore consists in a process of treatment by means of which the wet paste is mechanically treated to remove all free water and form it into a powder, as for instance by treatment in hydro-extractors, drying chambers or the like. It is then placed within a suitable agitator or mixer and the full proportion of oil necessary for the purpose mentioned added and the whole mixed and worked together until the waters of crystallization are dissolved and broken out (which will separate from the mass in the form of free globules of water) and the oil combines into paste form with the lead sulphate particles. The mass may be then treated to clear it of the freed water, as for instance by washing in streams of water.

The proportion of oil employed will vary according to the nature thereof, a smaller proportion being used when the oil is of light volatile nature as poppy seed oil than will be used when it is of heavier nature as linseed oil. It has been found from experiment that 9% or thereabouts will in most cases be sufficient.

I claim:—

1. A process for the conversion of sulphate of lead water pastes into oil pastes consisting in the submission of the water paste to an initial drying operation by which the free water is expressed and then in the submission of the lead to a churning action with oil in just sufficient quantity to break out the waters of crystallization from the lead particles and to be taken up by the said particles to form a stiff oil paste, substantially as specified.

2. A process for the conversion of sulphate of lead water pastes into oil pastes, according to claim 1, in which the proportion of oil used for churning with the lead paste is approximately 9 per cent by weight according to the nature of the oil employed, substantially as specified.

In testimony whereof, I affix my signature.

DAVID WHYTE.